May 5, 1970 A. CASADEI 3,510,144
SLED FOR SNOW AND ICE
Filed March 11, 1968 2 Sheets-Sheet 1
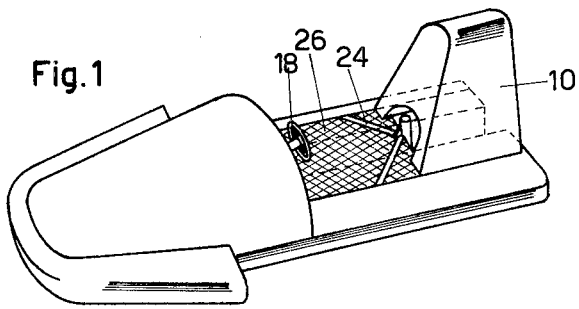
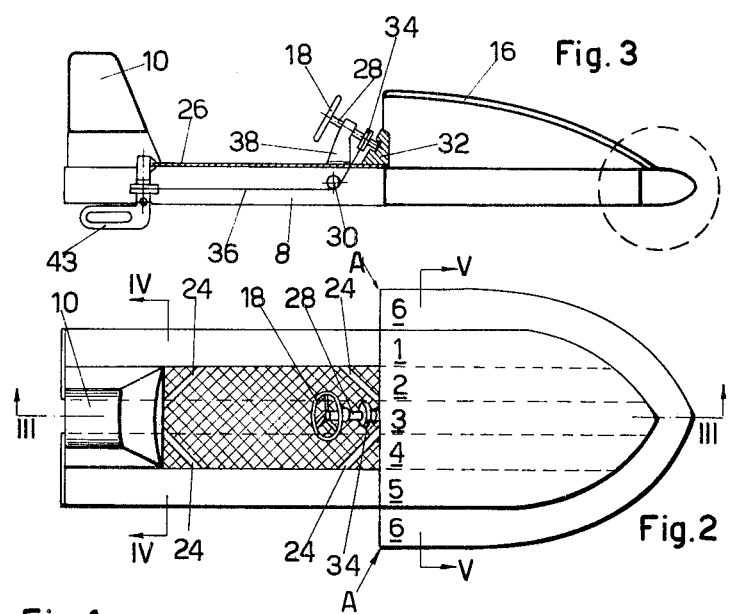
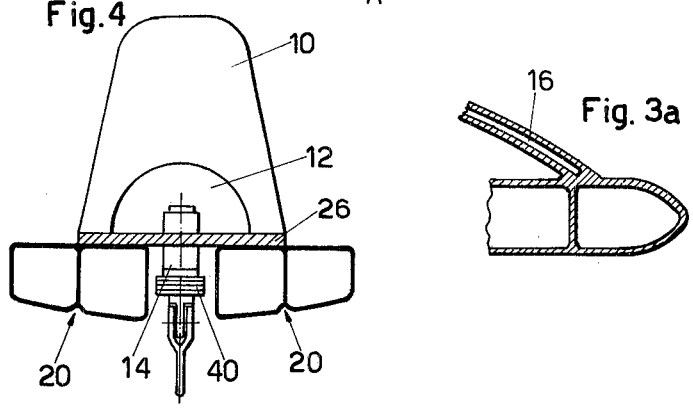
INVENTOR.
A. Casadei
BY Richards & Geier
ATTORNEYS May 5, 1970     A. CASADEI     3,510,144
SLED FOR SNOW AND ICE Filed March 11, 1968     2 Sheets-Sheet 2

INVENTOR.
A. Casadei
BY Richards & Geier
ATTORNEYS

United States Patent Office 3,510,144
Patented May 5, 1970

3,510,144
SLED FOR SNOW AND ICE
Antonio Casadei, 4 York Road, Kowloom
Tong-Kowloom, Hong Kong
Filed Mar. 11, 1968, Ser. No. 712,036
Int. Cl. B62b 13/08, 13/16
U.S. Cl. 280—21                                         9 Claims

ABSTRACT OF THE DISCLOSURE

A sled for transportation on ice and snow which has a flat airtight flexible body containing pressurized gas and having longitudinal vertical partitions forming intercommunicating tubular chambers. This body is composed of three envelopes, two of which are located in front and in the rear, while the third forms a seat back for the driver.

---

The present invention relates to a sled for snow or ice mainly comprising a thin walled flexible air tight structure which, when inflated with air or other gases, forms the sled bearing structure and being interposed between the useful load and the ground transmits to the latter the load through the pressure of the filling gas.

The load carried on the sled is concentrated in the central area of it and supported by a rigid plank to be mounted on the top surface of the flat central portion of the airtight structure before inflating it, which rigid plank as a consequence of the inflating operation becomes tied to the sled. From the rigid structure through the pressure of the gas contained in the airtight structure the load is transmitted to the ground: not only to the area underlying the rigid structure but to the whole surface covered by the sled and this because the flexible structure of the sled can stand, when inflated, remarkable bending moments.

The main advantage of such a sled is that it can be folded and stored in a very limited space, while very simple and easy procedures are required for putting it in operating conditions. Furthermore, it is light, handy and users are protected against shocks and against the wind during the run.

Further advantages and features will become apparent from the following detailed description of a preferred embodiment of the invention given as a non limitative example thereof with reference to the attached drawings wherein:

FIG. 1 is a perspective view of the sled of this invention ready for use;

FIG. 2 is a plan view of the same sled of FIG. 1;

FIG. 3 is a cross-section of the sled taken along line III—III of FIG. 2;

FIG. 3a illustrates an enlarged detail of the inflatable structure of the sled corresponding to the area within the dashed circular line of FIG. 3;

FIG. 4 is a cross-section of the sled taken along line IV—IV of FIG. 2;

Figures 6, 8:
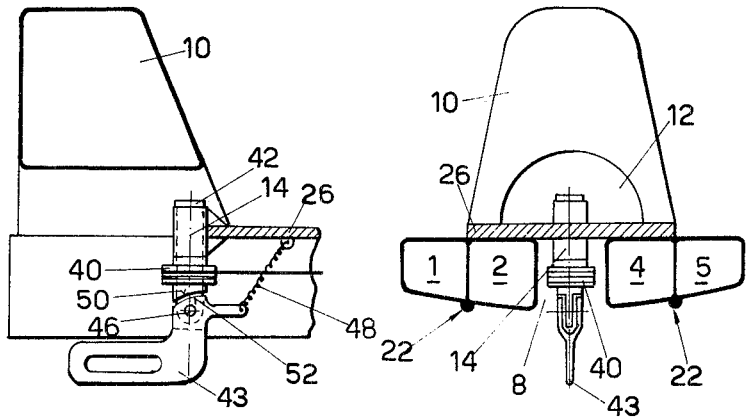
FIG. 6 shows a detail of the control rudder of the sled.
FIG. 8 shows a cross-section of the sled across like IV—IV thereof according to the same variant illustrated by FIG. 7.

With reference to the drawings, the sled of this invention comprises an airtight flat bag which is internally divided in longitudinal parallel chambers 1, 2, 3, 4, 5 by means of vertical partitions. The five chambers are intercommunicating through holes not shown; they have not the same length, while at one end (the rear end) they all terminate (except the central one) on a straight line, at the other end (the front end) they terminate on an arcuate line in a way that the two chambers beside the central one are shorter than the latter and the remaining two chambers are still shorter. The front ends of the chambers are surrounded by a sixth chamber 6 which is arc-shaped in plan view and terminates abruptly at the sides of the sled about midway of the latter. The central chamber also terminates at a point about midway of the sled, whereby a space 8 is left between the two chambers adjacent to the central one from said point backwards. This space is used, as will be better described hereinafter, for housing the control means of the rudder.

Above the back end sections of chambers 1, 2, 4, 5 and above space 8 a seat back is provided for the driver, which back is also made of an airtight chamber and, the same as all the other airtight chambers of the sled, is fabricated integral with said bag or attached to it by curing, vulcanizing, diecasting or by other processes according to the material of which the structure is formed as specified hereinafter.

Back 10 has the shape of a truncated pyramid with the front wall slightly concave for matching the driver's back. The lower wall will form a tunnel-like housing for receiving the bearing 14 of the rudder.

The front section of the sled is covered with a cowl 16 made of a double walled structure with longitudinal partitions which divided the space between the two walls into a plurality of intercommunicating tubular chambers. The cowl is united to the arc shaped chamber 6 and to the bag formed by chambers 1, 2, 3, 4, 5 along the line where these structures join together. After being inflated the cowl has a streamlined shape and provides a shelter for the steering wheel, the hands and the lower part of the driver's body.

The different compartments of the sled are inflated through four separate valves not shown. Chambers 1–5 are inflated through a first valve, chamber 6 with a second, cowl 7 with a third and seat back 10 with a fourth.

The above independent inflation of the separate compartments of the sled has the advantage of inflating them at different pressures. For instance, the compartment including chambers 1–5 will have stronger walls and will be inflated at higher pressure while for instance the cowl will have thinner walls and be inflated at a lower pressure. Another advantage is that in case of a puncture occurring in one compartment, only this will collapse and because punctures of the more exposed sections and of the thin walled compartments are more probable than any other area of the sled, it is preferable to have said compartments separated from the rest e.g. from chambers 1–5 which are the main bearing structure of the sled.

Figure 5:
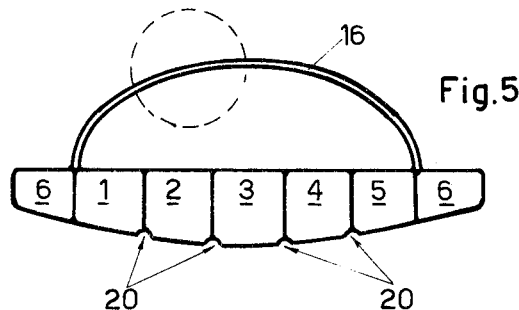
FIG. 5 is a cross-section of the sled taken along line V—V of FIG. 2.
Figure 7:
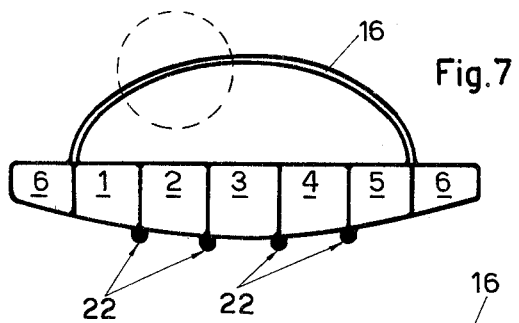
FIG. 7 illustrates a variant of the sled in a cross-section taken along line V—V of FIG. 2.
Figure 7A:
FIG. 7a illustrates an enlarged detail of the inflatable structure of the sled corresponding to the area within the dashed circuar line of FIGS. 5 and 7.

The sled bottom in contact with the ground is slightly convex crosswise the sled as shown by FIGS. 5 and 7. For ensuring a good directional stability of the sled, its bottom is provided with sharp edged grooves 20 which preferably will be located along the partitions by which chambers 1–5 are separated from one another and this for taking advantage of the greater thickness of the structure along the joint of the partitions to the bottom.

In the central area of the sled, from about line A—A to line IV—IV of FIG. 2, a strong plank 26, preferably a plywood, is applied on top of chambers 2 and 4 and covers also the space 8 between them. This plank is fastened to said bag by means of straps 24 before inflating it and remains securely attached thereto when the bag is inflated. The plank in plan view is dimensioned in a way that under the driver's weight, the pressure applied by the plank to the bag is less than the inflating pressure of it, so that the latter is not substantially deflected when loaded with the driver the weight of which is therefore transmitted to the ground through the pressure of the inflating gas only.

On plank 26 is fixedly mounted the control gear of the rudder comprising a steering wheel 18 with an inclined column 28 rotatably mounted on supporting brackets 32, 38 attached to plank 26; a pulley 34, fixedly mounted on column 28, which pulley is provided with a helical groove for receiving an endless cable 36, which cable by means of idle pulleys 30 is led to drive a corresponding pulley 40 fixedly mounted on the rudder vertical shaft 42. Shaft 42 is rotatably mounted on a bearing 44 which is attached to plank 28 by means of brackets.

At the lower end of shaft 42, a rudder 43 is pivotally mounted on pin 46. Rudder 43 is provided with a spring 48 which tends to rotate it in a vertical plane until a stop surface 52 integral with the rubber abuts against a corresponding surface 50 of shaft 42. A rotation of shaft 42 will correspond to a rotation of column 28, the ratio between said rotations being equal to the ratio between the diameters of pulleys 40 and 34.

As for the materials to be used for forming the sled airtight structure, one of the several synthetic substances may be used which are available on the market with flexibility and strength characteristics suitable for this purpose. Among them, vinyl resins are preferred and particularly those resins which are obtained by co-polymerization of vinyl choride. For making the thinner partitions within said airtight chambers, it is preferable to incorporate into the synthetic resin material a fabric material which is joined to the rest of the inflatable structure along the lines where the partitions join the bottom and the top of the structure.

After what has been said, the use of the sled is obvious.

First the load carrying plank 26 with the related steering gear is mounted at its place in the area ahead of the seat back 10, by inserting the plank corners underneath the diagonal straps 24; then the whole flexible structure of the sled is inflated with a conventional bellows air pump of the type used for inflating rubber boats. The sled is now ready for use. The driver will seat on plank 26 and rest his feet on the truncated ends of arcuated chamber 6 suitably reinforced.

The above described preferred embodiment is only an illustrative example of the many forms which may be envisaged for embodying the present invention. Obviously many variants and modifications can be introduced in this embodiment by those skilled in the art. However such variants and modifications will be included in the scope of the appended claims whenever they will conform to the principle of this invention and aim at the same end.

What is claimed is:

1. A sled for persons and good transportation on ice or snow of which sled the bearing structure comprises a flat airtight flexible envelope and the load carried by the sled is transmitted to the ground through the pressurized gas contained in said envelope, the latter being provided at its inside space with longitudinal partitions which along with the top and bottom walls of the envelope, when this is inflated, form a structure capable of standing to the moments which tend to deflect the inflated envelope out of the plane it normally is lying in; wherein said flat flexible envelope consists of a first envelope defined by two substantially parallel horizontal walls, with a plurality of parallel vertical internal partitions extending longitudinally from one end to the other of said envelope whereby a plurality of adjacent intercommunicating tubular chambers are formed to make up a flat cushion substantially rectangular with arcuate front end; a tubular arcuate chamber surrounding the front portion and terminating abruptly midway along the sides of said envelope to form two rest points for the driver's feet, a second envelope on top of the rear portion of the sled which envelope, when inflated, forms a seat back for the driver; a third envelope in the form of a streamlined cowl on top of the front portion of the sled, which envelopes are all flexible and airtight and united to one another and are inflated with air before the sled is used at a proper pressure proportioned to the strength and size and shape of said envelopes, said sled being completed with a rigid plank which is superimposed to said first envelope with the purpose of uniformly distributing the load carried by the sled on a large area of said envelope and of supporting the control gear of a rudder.

2. A sled as per claim 1 wherein the transverse profile of the bottom of said first envelope when inflated is substantially circular and convex downwards and said bottom is provided with sharp edged longitudinal grooves for ensuring the directional stability of the sled while running.

3. A sled as per claim 1, wherein the sled bottom is provided from one end to the other thereof with sharp-edged longitudinal ribs for ensuring the longitudinal stability of the sled while running.

4. A sled as per claim 1, wherein said rudder control gear comprises a steering wheel fixedly mounted on a column with a first pulley keyed thereon provided with a helical groove for receiving a continuous cable which, by means of idle pulleys, is led to drive a second pulley fixedly mounted on said rudder shaft; said column being rotatably mounted on bearings attached to the front portion of the plank while the rudder shaft is rotatably mounted on a bearing attached to the rear portion of the plank; said cable, idle pulleys, steering shaft and related pulley being housed in a space left free at the rear of the central chamber of the said first envelope.

5. A sled as per claim 1 wherein said three envelopes and arcuated chamber are made of a material adapted for being joined together along a continuous line by curing, vulcanizing and the like, whereby the three envelopes and related partitious and arcuated chamber are united to form a single continuous airtight structure.

6. A sled as per claim 1 in which the inner partitions by which said envelopes are divided into chambers are made of rubberized fabric and are attached to the envelope walls by the same process as used for joining the various parts of the envelopes one to the other and the same envelopes among them.

7. A sled as per claim 1 wherein said first envelope is provided with four diagonal straps attached thereto and the four corners of said plank are inserted underneath of said straps when the envelope is not inflated whereby said plank is fastened to the envelope when this is inflated because said straps are tightened as a consequence of the envelope inflation.

8. A sled as per claim 1 wherein the walls of the envelopes are made of vinyl resins obtained from vinyl chloride through a copolymerisation process.

9. A sled as per claim 1 wherein said first second and third envelopes and said arcuate chamber are inflated at different pressures.

References Cited

UNITED STATES PATENTS

| | | | |
|---|---|---|---|
| 2,334,072 | 11/1943 | Cooper | 9—2 |
| 2,686,323 | 8/1954 | McCarty et al. | 9—2 |
| 3,056,980 | 10/1962 | Holladay | 9—310 |
| 3,147,020 | 9/1964 | Dahl | 280—18 |
| 3,319,972 | 5/1967 | Gallaher | 280—18 |
| 3,416,171 | 12/1968 | Hennebutte | 9—310 |

LEO FRIAGLIA, Primary Examiner

R. R. SONG, Assistant Examiner